UNITED STATES PATENT OFFICE.

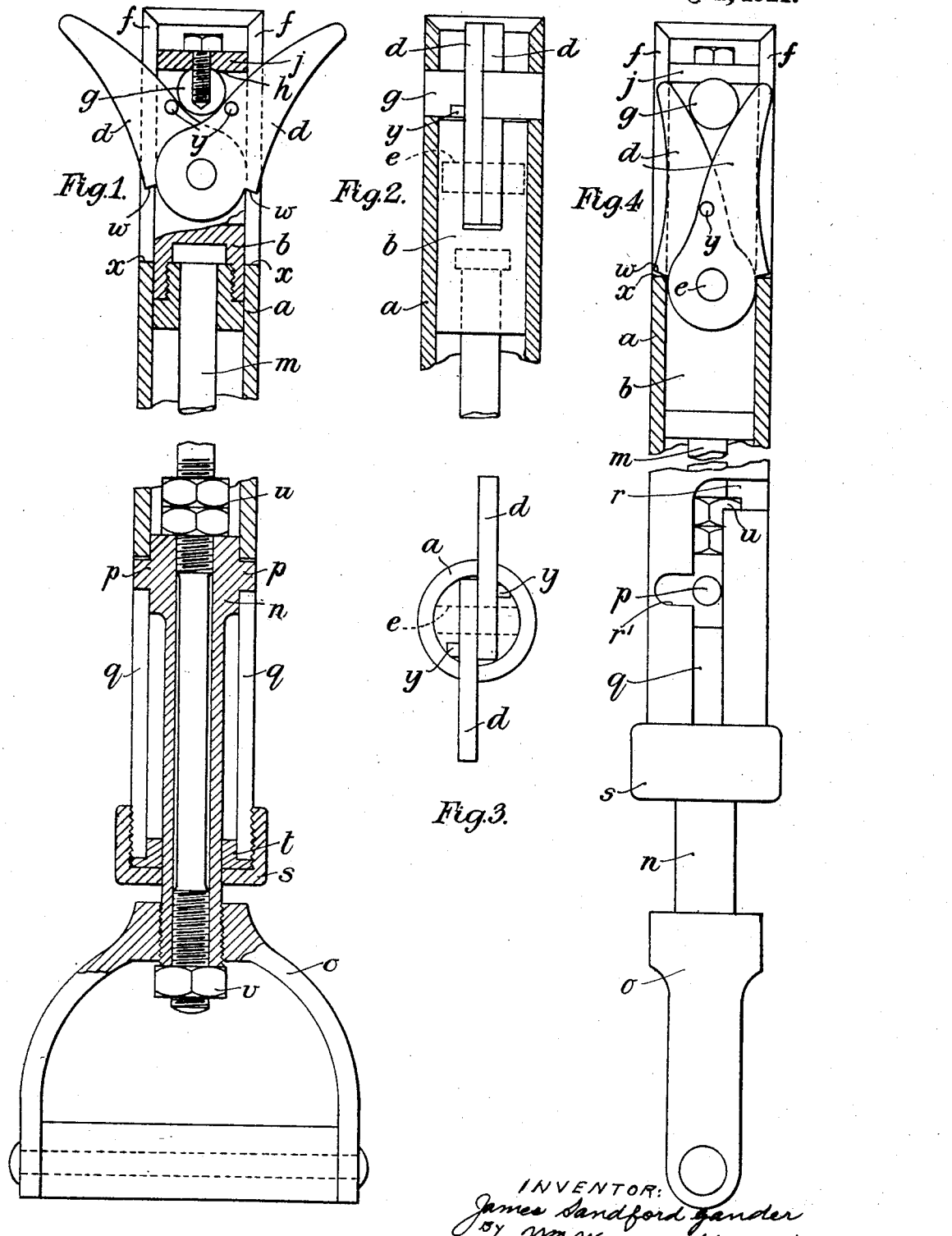

JAMES SANDFORD GANDER, OF FOREST GATE, ENGLAND.

ROTARY SCRAPING-TOOL.

1,386,249.  Specification of Letters Patent.  Patented Aug. 2, 1921.

Application filed March 8, 1921. Serial No. 450,725.

*To all whom it may concern:*

Be it known that I, JAMES SANDFORD GANDER, of Forest Gate, Essex, England, a subject of the King of Great Britain and Ireland, have invented certain new and useful Improvements in or Relating to Rotary Scraping-Tools, of which the following is a specification.

This invention relates to rotary scraping tools and is more particularly applicable to tools for scraping the interior of oil fuel burner passages.

The object of this invention is to provide a tool for cleaning or removing material from the interior surfaces of air passages, air baffles or other surfaces more particularly in connection with oil fuel burners, where the parts to be operated upon are larger in diameter than the available orifice.

A scraping tool made in accordance with this invention comprises a casing, a sliding member adapted to slide axially in said casing, one or more cutters or scrapers mounted on said sliding members, slots formed in said casing adapted to permit movement of the said cutters or scrapers, means for making the cutters or scrapers extend when the sliding member is moved axially in one direction and to contract when moved in the other direction, means for moving said sliding member, means for adjusting the amount of said extension of the scrapers or cutters and means for retaining the scrapers or cutters in the expanded position.

The drawings filed herewith show one form of scraping tool made in accordance with this invention in which—

Figure 1 is a sectional elevation showing the cutters in the expanded position.

Fig. 2 is a sectional view of Fig. 1 at right angles to that in Fig. 1.

Fig. 3 is an end view showing the cutters expanded.

Fig. 4 is a partly sectional view of Fig. 1 showing the cutters in their closed position.

The scraping tool comprises a casing $a$ in which is mounted a sliding member or crosshead $b$ carrying two scrapers $d\ d$ pivotally mounted on a pin $e$. The casing $a$ is slotted at $f\ f$ to allow the scrapers $d\ d$ to move outward through the casing which is formed into a cutting edge at its extremity. The object of this cutting edge on the end of the casing is to enable the tool to clean its way through the passage in case the latter is choked with carbon deposit, etc. A pin $g$, disposed between the ends of the scrapers, is carried in holes in the casing $a$ and is prevented from axial movement by the set screw $h$ and disk $j$ secured within the casing $a$ near one end thereof, and which set screw $h$ is threaded into the pin $g$ radially thereof. The function of the pin $g$ is to force the scrapers outward when the crosshead $b$ is moved toward the said pin. The crosshead $b$ is connected to a rod $m$ which carries a sleeve $n$ screwed or otherwise secured to a handle $o$. The sleeve $n$ carries two studs $p\ p$ coacting in slots $q\ q$ in the casing. At the ends adjacent to the crosshead of each of the slots $q\ q$ is formed a notch or recess $r$. A recess $r'$ is also formed in each slot $q$. The end of the casing next the handle is adapted to be closed by a screwed cap $s$ and as the slots $q\ q$ extend to the end of the casing a washer $t$ is provided to prevent the casing "closing in" when the cap $s$ is screwed on. The rod $m$ is clamped in the sleeve $n$ by lock nuts $u$ and $v$, which bear on the ends of the said sleeve and an adjustment may be effected with these lock nuts whereby the range of opening of the scrapers may be varied. The scrapers are provided with steps $w\ w$ which bear on the shoulders $x\ x$ formed by the ends of the slots $f\ f$ when the crosshead $b$ is drawn down. Pins $y\ y$ are also provided on the scrapers to prevent them opening too far and to insure that the steps $w\ w$ engage fairly with the shoulders $x\ x$ at not too great an angle.

In operation the scrapers are first brought to the contracted position as shown in Fig. 4 which is effected by withdrawing the handle till the shoulders $x\ x$, bear on the steps $w\ w$ of the scrapers and then the handle is turned to the left causing the stud $p$ to enter the recess $r'$. The tool is then inserted through the orifice and as the stud $p$ is in the recess $r'$ the sleeve will not move forward in the casing and the cutters will not be caused to expand prematurely.

When the tool is in position the handle is pushed inward and turned to the right thereby causing the scrapers to expand under the action of being pressed apart by the pin $g$; the studs $p\ p$ travel up the slots $q\ q$ and as the handle is turned to the right they will enter the recess $r$, formed at the extremity of each slot and lock the scrapers in the expanded position. The tool is now ready for use and by continuing the rotation to the right the scrapers can be made to operate on the surfaces to be dealt with. When the operation is completed rotation of the handle in the opposite direction will cause the studs to disengage from their recesses and allow the scrapers to close whereon the tool may be withdrawn. To disassemble the tool it is only necessary to remove the screw $h$ and disk $j$ which allow the pin $g$ to be withdrawn and when the nut $v$ on the rod is unscrewed, the rod, crosshead and scrapers can be removed from the casing. The pin $e$ which is the pivot for the scrapers is made a loose working fit and is only retained in position by the sides of the casing thereby rendering it an easy matter to remove and fit on the same tool new or differently shaped scrapers which can be made in various curvatures according to requirements. The casing may be fluted (as in the manner of a reamer for example) so that it will serve to clean the orifice as it passes through.

With a device made in accordance with this invention the process of cleaning out an oil burner cup or other passage of larger diameter than the available orifice will be easily accomplished.

What I claim and desire to secure by Letters Patent is:—

1. A scraping tool for scraping inside surfaces comprising a casing, a sliding member disposed in said casing, scrapers carried by said sliding member, said casing having slots therein to permit movement of said scrapers, a pin disposed in said casing between the said scrapers adapted to extend them when said sliding member is moved in one direction, means for moving said sliding member, means for preventing the cutters from opening prematurely, and means for retaining said scrapers in the extended position.

2. A scraping tool for scraping inside surfaces comprising a casing, a sliding member disposed in said casing, scrapers carried by said sliding member, said casing having slots therein to permit movement of said scrapers, a pin disposed in said casing between the said scrapers adapted to extend them when said sliding member is moved in one direction, means for moving said sliding member, means for preventing the cutters from opening prematurely, and means for retaining said scrapers in the extended position comprising a rod secured to said sliding member, a sleeve carried by said rod, studs formed on said sleeve, said casing having grooves in which said studs move and said grooves having recesses adapted to receive said studs thereby locking the said sleeve, rod and sliding member and consequently the said scrapers in the extended position.

In testimony whereof I have signed my name to this specification.

JAMES SANDFORD GANDER.